(12) United States Patent
Carminati et al.

(10) Patent No.: US 11,035,427 B2
(45) Date of Patent: Jun. 15, 2021

(54) METHOD FOR MANUFACTURING A BRAKE DISC AND BRAKE DISC FOR DISC BRAKES

(71) Applicant: FRENI BREMBO S.P.A., Curno, Bergamo (IT)

(72) Inventors: Fabiano Carminati, Curno (IT); Paolo Vavassori, Curno (IT); Simone Biondo, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 197 days.

(21) Appl. No.: 15/758,796

(22) PCT Filed: Sep. 9, 2016

(86) PCT No.: PCT/IB2016/055372
§ 371 (c)(1),
(2) Date: Mar. 9, 2018

(87) PCT Pub. No.: WO2017/046681
PCT Pub. Date: Mar. 23, 2017

(65) Prior Publication Data
US 2019/0056003 A1    Feb. 21, 2019

(30) Foreign Application Priority Data

Sep. 14, 2015   (IT) .................. 102015000051154

(51) Int. Cl.
*F16D 65/12*   (2006.01)
*C23C 4/06*   (2016.01)
(Continued)

(52) U.S. Cl.
CPC .............. *F16D 65/125* (2013.01); *C23C 4/06* (2013.01); *C23C 4/129* (2016.01); *C23C 24/04* (2013.01);
(Continued)

(58) Field of Classification Search
CPC ................. F16D 65/125; F16D 65/127; F16D 2250/0046; C23C 4/06; C23C 4/129; C23C 24/04; C23C 28/027
See application file for complete search history.

(56) References Cited

U.S. PATENT DOCUMENTS 4,715,486 A * 12/1987 Burgdorf .............. F16D 65/127
                                                   192/107 M
5,612,110 A * 3/1997 Watremez ............. F16D 65/123
                                                   428/66.2
(Continued)

FOREIGN PATENT DOCUMENTS

CN          1174247 A       2/1998
CN        102286744 A      12/2011
(Continued)

OTHER PUBLICATIONS

European Patent Office, International Search Report with Written Opinion, issued in PCT/IB2016/055372, dated Nov. 28, 2016, 9 pages, European Patent Office, Rijswick. Netherlands.

(Continued)

*Primary Examiner* — Melody M Burch
(74) *Attorney, Agent, or Firm* — Marshall & Melhorn, LLC

(57) ABSTRACT

A method for manufacturing a brake disc may have the following operating steps: a) preparing a brake disc, with a braking band and provided with two mutually opposite braking surfaces; b) depositing on the disc a layer of chromium carbide (Cr3C2) and nickel-chromium (NiCr) in particulate form forming a base protective coating; and c) depositing over the base protective coating a material in particulate form with the tungsten carbide (WC) and cobalt (Co) forming a surface protective coating. Both protective coatings are created with HVOF (High Velocity Oxygen (Continued)

Fuel), HVAF (High Velocity Air Fuel) or KM (Kinetic Metallisation) technique.

18 Claims, 2 Drawing Sheets

(51) Int. Cl.
*C23C 24/04* (2006.01)
*C23C 28/02* (2006.01)
*C23C 4/129* (2016.01)

(52) U.S. Cl.
CPC .......... *C23C 28/027* (2013.01); *F16D 65/127* (2013.01); *F16D 2250/0046* (2013.01)

(56) References Cited

U.S. PATENT DOCUMENTS

| | | | | |
|---|---|---|---|---|
| 6,412,611 | B1* | 7/2002 | Pribonic | B60L 7/28 |
| | | | | 187/375 |
| 7,490,704 | B2* | 2/2009 | Hara | F16D 69/0408 |
| | | | | 188/250 G |
| 9,879,740 | B2 | 1/2018 | Tironi et al. | |
| 2001/0002362 | A1* | 5/2001 | Guiselin | B24D 3/004 |
| | | | | 451/540 |
| 2007/0144839 | A1* | 6/2007 | Seksaria | F16D 51/14 |
| | | | | 188/218 R |
| 2011/0293849 | A1* | 12/2011 | Lembach | F16D 65/127 |
| | | | | 427/535 |
| 2013/0177437 | A1* | 7/2013 | Amancherla | C23C 4/18 |
| | | | | 416/241 R |
| 2015/0354647 | A1* | 12/2015 | Tironi | C23C 24/04 |
| | | | | 188/218 XL |
| 2016/0290423 | A1 | 10/2016 | Tironi et al. | |

FOREIGN PATENT DOCUMENTS

| | | | |
|---|---|---|---|
| CN | 103194753 A | | 7/2013 |
| WO | 2014/097186 A1 | | 6/2014 |
| WO | 2014/097187 A2 | | 6/2014 |
| WO | WO-2014097186 A1 * | 6/2014 | ........... F16D 65/127 |

OTHER PUBLICATIONS

Patent Office of the Peoples Republic of China. Search Report issue in Application CN 2016800531262, dated Dec. 18, 2018, Beijing, China.

\* cited by examiner

METHOD FOR MANUFACTURING A BRAKE DISC AND BRAKE DISC FOR DISC BRAKES

FIELD OF APPLICATION

This invention relates to a method for making a brake disc and brake disc for disc brakes.

STATE OF THE ART

A brake disc of a disc braking system of a vehicle comprising an annular structure, or braking band, and a central fixing element, known as bell, through which the disc is fixed to the rotating part of a vehicle suspension, for example a hub. The braking band is provided with opposed braking surfaces suitable to cooperate with friction elements (brake pads), housed in at least one calliper body placed astride such braking band and integral with a non-rotating component of the vehicle suspension. The controlled interaction between the opposite brake pads and the opposed braking surfaces of the braking band determining a braking action by friction that allows the deceleration or stopping of the vehicle.

Generally, the brake disc is made of grey cast iron or steel. In fact, this material allows obtaining good braking performance (especially in terms of containment of wear) at relatively low cost. Discs made of carbon or carbon-ceramic materials offer much better performance, but at much higher costs.

The limitations of traditional cast iron or steel discs are connected to excessive wear. As regards grey cast iron discs, another very negative aspect is linked to excessive surface oxidation, with consequent formation of rust. This aspect impacts both the performance of the brake disc and its appearance, since rust on the brake disc is aesthetically unacceptable to the user. Attempts have been made to address these problems by making discs from grey cast iron or steel with a protective coating. On the one hand, the protective coating reduces wear of the disc and, on the other, protects the surface of the grey cast iron base from oxidation, thus avoiding the formation of a layer of rust. However, while the protective coatings available today offer wear resistance, they are subject to flaking that results in their detachment from the disc itself.

Discs made of aluminium have been proposed as an alternative to grey cast iron discs or to steel discs in order to reduce the weight of the disc. The aluminium discs are provided with protective coatings. On the one hand, the protective coating serves to reduce disc wear and thus ensure similar performance to cast iron discs and, on the other, to protect the aluminium base from temperatures generated during braking, which are well above the softening temperatures of aluminium (200-400° C.).

However, while offering wear resistance, the protective coatings available today and applied on aluminium, cast iron or steel discs are subject to flaking that results in their detachment from the aluminium disc itself.

A protective coating of this type is described for example in patent U.S. Pat. No. 4,715,486, relative to a low-wear disc brake. The disc, made in particular of cast iron, has a coating consisting of a particulate material deposited on the disc with a high kinetic energy impact technique. According to a first embodiment, the coating contains from 20% to 30% tungsten carbide, 5% nickel and the remaining part a mixture of chromium carbide and tungsten. According to a second embodiment, the coating contains from 80% to 90% tungsten carbide, up to 10% cobalt, up to 5% chromium and up to 5% carbon.

In the case of application of the coating with flame spray, one cause of the detachment of traditional protective coatings from aluminium or aluminium alloy discs is the presence of free carbon in the protective coating. This phenomenon also affects the grey cast iron or steel discs. In fact, the carbon tends to burn, combining with the oxygen incorporated in the protective coating during its formation. This leads to the formation of micro-bubbles in the coating, which can prevent an adequate adhesion of the coating to the disc, favouring detachment thereof.

From the above it is clear that aluminium, aluminium alloy, grey cast iron or steel discs with protective coatings are not currently usable in the braking systems sector.

However, in view of the advantages in terms of wear resistance provided by these protective coatings, there is a strongly felt need to solve the drawbacks mentioned in reference to the known art. In particular, there is a need for aluminium, grey cast iron or steel discs with protective coatings that are able to increase the wear resistance of the disc and, at the same time, are durable over time.

A solution to the above problems has been proposed by the same applicant in international application WO2014/097187, as regards grey cast iron or steel discs, and in international application WO2014/097186, as regards aluminium discs.

In the case of grey cast iron or steel discs, it consists in realising a protective coating on the braking surfaces of a brake disc obtained by depositing a material in particulate form consisting of from 70% to 95% tungsten carbide by weight, from 5% to 15% cobalt by weight, and from 1% to 10% chromium by weight. The deposition of the material in particulate form is obtained with an HVOF (High Velocity Oxygen Fuel), HVAF (High Velocity Air Fuel) or KM (Kinetic Metallisation) technique.

In more in detail, according to the solution provided in WO2014/097187 the combination of the HVOF, HVAF or KM deposition technique and the chemical components used for the formation of the coating allows obtaining a protective coating with high bond strength, which provides a high anchoring capacity on grey cast iron or steel. The particulate material used does not contain free carbon (C), neither in trace form. This allows significantly reducing flaking phenomena of the protective coating.

In the case of aluminium or aluminium alloy discs, the material in particulate form used to create the protective coating consists of from 80% to 90% tungsten carbide by weight, from 8% to 12% cobalt by weight, and from 2% to 6% chromium by weight. In this case as well, the deposition of the material in particulate form is obtained with an HVOF (High Velocity Oxygen Fuel), HVAF (High Velocity Air Fuel) or KM (Kinetic Metallisation) technique.

Effects similar to those for grey cast iron or steel discs are obtained, i.e., a protective coating with high bonding strength and reduction of flaking related to the presence of free carbon.

The adoption of the solution proposed in WO2014/097187, for grey cast iron or steel discs, or WO2014/097186, for aluminium or aluminium alloy discs, can significantly reduce the flaking of the protective coating found in the prior art, but does not eliminate it completely. In fact, even aluminium or aluminium alloy, grey cast iron or steel discs with a protective coating according to WO2014/097186 or WO2014/097187 continue to be subject to flaking and yielding of the protective coating, although to a lesser degree with respect to the prior art.

Therefore, the reference sector continues to need discs (made of aluminium, grey cast iron or steel) with protective coatings that are even less subject to flaking, in order to ensure wear resistance over time.

PRESENTATION OF THE INVENTION

The need for discs with protective coatings that are even less subject to flaking, so as to ensure wear resistance over time, is satisfied by a method for making a brake disc according to claim 1 and by a brake disc for disc brakes according to claim 13.

In particular, this need is satisfied by a method for making an aluminium brake disc with protective coating comprising the following operating steps:

a) preparing a brake disc, comprising a braking band and provided with two opposite braking surfaces, each of which defines at least partially one of the two main faces of the disc, the braking band being made of aluminium or aluminium alloy, or being made of grey cast iron or steel;

b) depositing on the disc a layer of chromium carbide ($Cr_3C_2$) and nickel-chromium (NiCr) in particulate form with HVOF (High Velocity Oxygen Fuel), HVAF (High Velocity Air Fuel) or KM (Kinetic Metallisation) technique forming a base protective coating that covers at least one of the two braking surfaces of the braking band in direct contact with them; and c) depositing, over said base protective coating, a material in particulate form consisting of tungsten carbide (WC) and cobalt (do) with HVOF (High Velocity Oxygen Fuel), HVAF (High Velocity Air Fuel) or KM (Kinetic Metallisation) technique forming a surface protective coating that covers at least one of the two braking surfaces of the braking band.

Preferably, the material in particulate form deposited in deposition step b) to create the base protective coating 30 is constituted by 65% to 95% of chromium carbide ($Cr_3C_2$) and the remaining by nickel-chromium (NiCr).

In particular, the material in particulate form deposited in deposition step b) to create the base protective coating 30 can have the following compositions:

93% by weight of chromium carbide ($Cr_3C_2$), and 7% of nickel-chromium (NiCr);

90% by weight of chromium carbide ($Cr_3C_2$), and 10% of nickel-chromium (NiCr);

75% by weight of chromium carbide ($Cr_3C_2$), and 25% of nickel-chromium (NiCr); or 65% by weight of chromium carbide ($Cr_3C_2$), and 35% of nickel-chromium (NiCr).

Preferably, the material in particulate form deposited in deposition step b) to create the base protective coating 30 is constituted by 75%, by weight, chromium carbide ($Cr_3C_2$) and 25% nickel-chromium (NiCr).

Preferably, the nickel-chromium (NiCr) is constituted by 80% of nickel and 20% of chromium.

Preferably, the material in particulate form deposited in deposition step c) to create the surface protective coating 3 is constituted by 80% to 90%, by weight, of tungsten carbide (WC) and the remaining by cobalt (Co). Even more preferably, the material in particulate form deposited in deposition step c) to create the surface protective coating 3 is constituted by 88%, by weight, of tungsten carbide (WC) and 12% of cobalt (Co), or by 83%, by weight, of tungsten carbide (WC) and 17% of cobalt (Co).

According to a particularly preferred implementation of the invention, both the material in particulate form deposited in deposition step b) to create the base protective coating and the material in particulate form deposited in deposition step c) to create the surface protective coating are deposited with HVOF (High Velocity Oxygen Fuel) technique.

Preferably, the base protective coating 30 has a thickness of between 20 μm and 60 μm, and preferably equal to 40 μm.

Preferably, the surface protective coating 3 has a thickness of between 30 μm and 70 μm, and preferably equal to 50 μm.

Advantageously, the material in particulate form that is deposited in step b) to form the base protective coating has a particle size between 5 and 40 μm.

Advantageously, the material in particulate form that is deposited in step c) to form the surface protective coating has a particle size between 5 and 40 μm.

According to a particularly preferred implementation of the invention, deposition step b) comprises two or more distinct deposition passages of chromium carbide ($Cr_3C_2$) and nickel-chromium (NiCr) on the same surface to form the base protective coating.

In particular, deposition step b) comprises a first deposition passage of chromium carbide ($Cr_3C_2$) and nickel-chromium (NiCr) in particulate form to create a first base protective layer directly on the disc and a second deposition passage of chromium carbide ($Cr_3C_2$) and nickel-chromium (NiCr) in particulate form to create a second layer over the first layer, the chromium carbide ($Cr_3C_2$) and nickel-Chromium (NiCr) deposited with the first deposition passage having a particle size greater than that deposited with the second deposition passage.

Still more in particular, the chromium carbide ($Cr_3C_2$) and nickel-chromium (NiCr) deposited with the first deposition passage have a particle size between 30 and 40 μm, while the chromium carbide ($Cr_3C_2$) and nickel-chromium (NiCr) deposited with the second deposition passage have a particle size of between 5 and 20 μm.

Preferably, in step b) the deposition of chromium carbide ($Cr_3C_2$) and nickel-Chromium (NiCr) in particulate form is carried out in a differentiated manner on the surface of the disc at least in terms of the coating thickness.

In particular, each main face of the disc is defined at least by a first annular portion, corresponding to a braking surface of the braking band, and by a second annular portion, which is more internal with respect to the first and which defines the area of fixing of the disc to a vehicle. In deposition step b), a base protective coating is created to cover at least both portions. The base protective coating created on the first annular portion has a thickness greater than that of the base protective coating created on the second portion.

Advantageously, step c) of deposition of tungsten carbide (WC) and cobalt (Co) comprises two or more distinct steps of deposition of the particulate material on the same surface to form the surface protective coating.

In particular, the deposition step c) comprises a first deposition passage of the material in particulate form to create a first layer of surface protective coating directly on the base protective coating and a second deposition passage of the material in particulate form to create a second layer on the first layer. The particulate material deposited with the first deposition passage has a larger particle size than that deposited with the second deposition pass.

Even more in particular, the particulate material (tungsten carbide and cobalt) deposited with the first deposition passage has a particle size between 30 and 40 μm, while the particulate material deposited with the second deposition passage has a particle size of between 5 and 20 μm.

Preferably, in deposition step c), the particulate material (tungsten carbide and cobalt) is deposited in a differentiated manner on the surface of the disc at least in terms of the coating thickness. In particular, the surface protective coating created on the first annular portion has a thickness greater than that of the surface protective coating created on the second portion.

In particular, the need to have discs with protective coatings that are even less subject to flaking is satisfied by a brake disc for disc brake, comprising a braking band, provided with two opposite braking surfaces, each of which defines at least partially one of the two main faces of the disc.

The braking band can be made of aluminium or aluminium alloy, grey cast iron or steel.

According to a particularly preferred embodiment of the invention, the braking band of the disc is made of grey cast iron. In particular, the entire disc is made of grey cast iron.

The disc has a base protective coating that covers at least one of the two braking surfaces of the braking band. The base protective coating is constituted by chromium carbide ($Cr_3C_2$) and nickel-chromium (NiCr) and is obtained by depositing, directly on the disc, chromium carbide ($Cr_3C_2$) and nickel-chromium (NiCr) in particulate form with HVOF (High Velocity Oxygen Fuel), HVAF (High Velocity Air Fuel) or KM (Kinetic Metallisation) technique).

The disc is also provided with a surface protective coating that covers at least one of the two braking surfaces of the braking band. The surface protective coating is constituted by tungsten carbide (WC) and cobalt (Co) and is obtained by depositing, on the base protective coating, tungsten carbide (WC) and cobalt (Co) in particulate form with HVOF (High Velocity Oxygen Fuel), HVAF (High Velocity Air Fuel) or KM (Kinetic Metallisation) technique.

Preferably, the base protective coating is constituted by 65% to 95% of chromium carbide ($Cr_3C_2$) and the remaining by nickel-chromium (NiCr).

In particular, the base protective coating can have the following compositions:

93% by weight of chromium carbide ($Cr_3C_2$), and 7% of nickel-chromium (NiCr);

90% by weight of chromium carbide ($Cr_3C_2$), and 10% of nickel-chromium (NiCr);

75% by weight of chromium carbide ($Cr_3C_2$), and 25% of nickel-chromium (NiCr); or 65% by weight of chromium carbide ($Cr_3C_2$), and 35% of nickel-chromium (NiCr).

Preferably, the base protective coating 30 is constituted by 75%, by weight, of chromium carbide ($Cr_3C_2$) and 25% of nickel-chromium (NiCr).

Preferably, the nickel-chromium (NiCr) is constituted by 80% of nickel and 20% of chromium.

Preferably, the surface protective coating (3) is constituted by 80% to 90% by weight of tungsten carbide (WC) and the remaining by cobalt (Co). Even more preferably, the surface protective coating 3 is constituted by 88%, by weight, of tungsten carbide (WC) and 12% of cobalt (Co), or 83%, by weight, of tungsten carbide (WC) and 17% of cobalt (Co).

Advantageously, the base protective coating has a thickness between 20 µm and 60 µm, preferably 40 µm.

Advantageously, the surface protective coating has a thickness between 30 µm and 70 µm, preferably 50 µm.

DESCRIPTION OF THE DRAWINGS

Further characteristics and advantages of this invention will be more understandable from the following description of its preferred and non-limiting examples of embodiments, in which.

The elements, or parts of elements, in common between the embodiments described below will be indicated with the same reference numbers.

DETAILED DESCRIPTION

Figure 1:
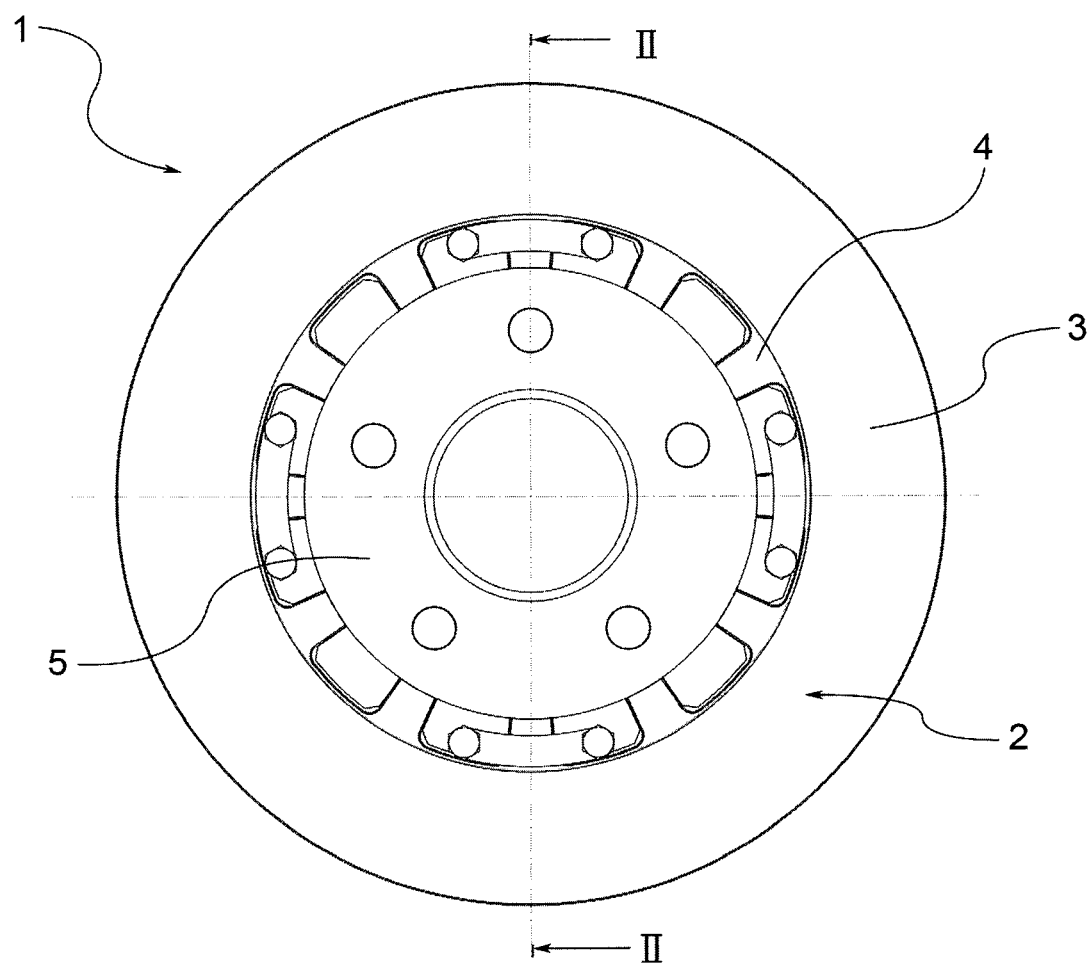
FIG. 1 shows, in plan view from above, a disc brake according to an embodiment of this invention.

With reference to the above figures, number 1 globally indicates a brake disc according to this invention.

According to a general embodiment of the invention, illustrated in the accompanying figures, the brake disc 1 comprises a braking band 2, provided with two opposite braking surfaces 2a and 2b, each of which defines at least partially one of the two main faces of the disc.

The braking band 2 can be made of aluminium or aluminium alloy, can be made of grey cast iron or steel.

Preferably, the braking band is made of grey cast iron. In particular, the entire disc is made of grey cast iron. Therefore, in the rest of the description, reference will be made to a grey cast iron disc, without however excluding the possibility that it is made of aluminium or its alloys or steel.

The disc 1 is provided with:

a base protective coating 30 that covers at least one of the two braking surfaces of the braking band and is made in direct contact with these surfaces; and a surface protective coating 3 that covers at least one of the two braking surfaces of the braking band and is made to cover the aforesaid base protective coating 30.

The base protective coating 30 is constituted by chromium carbide ($Cr_3C_2$) and nickel-chromium (NiCr) and is obtained by depositing, directly on the disc 1, chromium carbide ($Cr_3C_2$) and nickel-chromium (NiCr) in particulate form with HVOF (High Velocity Oxygen Fuel), HVAF (High Velocity Air Fuel) or KM (Kinetic Metallisation) technique.

Preferably, the base protective coating 30 is constituted by 65% to 95% of chromium carbide ($Cr_3C_2$) and the remaining by nickel-chromium (NiCr).

In particular, the base protective coating 30 can have the following compositions:

93% by weight of chromium carbide ($Cr_3C_2$), and 7% of nickel-chromium (NiCr);

90% by weight of chromium carbide ($Cr_3C_2$), and 10% of nickel-chromium (NiCr);

75% by weight of chromium carbide ($Cr_3C_2$), and 25% of nickel-chromium (NiCr); or 65% by weight of chromium carbide ($Cr_3C_2$), and 35% of nickel-chromium (NiCr).

Preferably, the base protective coating 30 is constituted by 75%, by weight, of chromium carbide ($Cr_3C_2$) and 25% of nickel-chromium (NiCr).

Preferably, the nickel-chromium (NiCr) is constituted by 80% of nickel and 20% of chromium.

The surface protective coating 3 is constituted by tungsten carbide (WC) and cobalt (Co) and is obtained by depositing, on the base protective coating 30, tungsten carbide (WC) and cobalt (Co) in particulate form with HVOF (High Velocity Oxygen Fuel), HVAF (High Velocity Air Fuel) or KM (Kinetic Metallisation) technique.

Preferably, the surface protective coating 3 is constituted by 80% to 90% by weight of tungsten carbide (WC) and the remaining by cobalt (Co). Even more preferably, the surface protective coating 3 is constituted by 88%, by weight, of tungsten carbide (WC) and 12% of cobalt (Co), or 83%, by weight, of tungsten carbide (WC) and 17% of cobalt (Co).

Advantageously, the base protective coating 30 has a thickness comprised between 20 μm and 60 μm, and preferably equal to 40 μm, while the surface protective coating 3 has a thickness of between 30 μm and 70 μm, and preferably equal to 50 μm.

It has been possible to verify that the presence of the base protective coating 30 of chromium carbide ($Cr_3C_2$) and nickel-chromium (NiCr) under the surface protective coating 3 substantially eliminates the flaking phenomena that plague traditional discs.

In more detail, in traditional discs with protective coatings, it was found that the flaking is induced by oxidation of the interface zone between the disc and coating. This oxidation is generally caused by the penetration of moisture between the disc and coating. The presence of a layer of chromium carbide ($Cr_3C_2$) and nickel-chromium (NiCr) that forms the base protective coating 30 effectively counteracts such oxidative phenomena, solving at the root the problem of flaking of the surface protective coating 3 with anti-wear function. In other words, the base protective coating 30 performs an anti-corrosive function, which associates itself to the anti-wear function of the surface protective coating 3 (of tungsten carbide and cobalt). The anti-corrosive action benefits the integrity and adherence to the disc of the surface protective coating 3.

The base protective coating 30 also performs a mechanical function of "damping" for the surface protective coating (anti-wear). In fact, the base protective coating 30 formed by chromium carbide and nickel-chromium presents, has a higher degree of ductility with respect to the surface protective coating 3 formed of tungsten carbide and cobalt. This gives to the base layer 30 an elastic behaviour that mitigates—at least partly—the stresses applied to the disc when in use. Thus, the base protective coating 30 acts as a sort of damper or cushion between the disc and the surface protective coating 3. In this way, it prevents a direct transmission of stresses between the two parts, thus reducing the risk of triggering cracks in the surface protective coating 3.

As regards the anti-wear function, the surface protective coating 3 results to be not influenced by the presence of the base protective coating 30 made of chromium carbide and nickel-chromium.

For the sake of simplicity, the brake disc 1 will now be described along with the method according to this invention. The brake disc 1 is made preferably, but not necessarily, with the method according to the invention which will now be described.

According to a general form of implementation of the method according to the invention, the method comprises the following operational steps:

a) preparing a brake disc, comprising a braking band and provided with two opposite braking surfaces, each of which defines at least partially one of the two main faces of the disc, the braking band being made of aluminium or aluminium alloy, or being made of grey cast iron or steel;

b) depositing on the disc a layer of chromium carbide ($Cr_3C_2$) and nickel-chromium (NiCr) in particulate form with HVOF (High Velocity Oxygen Fuel), HVAF (High Velocity Air Fuel) or KM (Kinetic Metallisation) technique forming a base protective coating that covers at least one of the two braking surfaces of the braking band in direct contact with them; and c) depositing, over said base protective coating, a material in particulate form consisting of tungsten carbide (WC) and cobalt (Co) with HVOF (High Velocity Oxygen Fuel), HVAF (High Velocity Air Fuel) or KM (Kinetic Metallisation) technique forming a surface protective coating that covers at least one of the two braking surfaces of the braking band.

Preferably the material in particulate form deposited in deposition step b) to create the base protective coating 30 is constituted by 65% to 95% of chromium carbide ($Cr_3C_2$) and the remaining by nickel-chromium (NiCr).

In particular, the material in particulate form deposited in deposition step b) to create the base protective coating 30 can have the following compositions:

93% by weight of chromium carbide ($Cr_3C_2$), and 7% of nickel-chromium (NiCr);

90% by weight of chromium carbide ($Cr_3C_2$), and 10% of nickel-chromium (NiCr);

75% by weight of chromium carbide ($Cr_3C_2$), and 25% of nickel-chromium (NiCr); or 65% by weight of chromium carbide ($Cr_3C_2$), and 35% of nickel-chromium (NiCr).

Preferably, the material in particulate form deposited in deposition step b) to create the base protective coating 30 is constituted by 75%, by weight, of chromium carbide ($Cr_3C_2$) and 25% of nickel-chromium (NiCr).

Preferably, the nickel-chromium (NiCr) is constituted by 80% of nickel and 20% of chromium.

Preferably, the material in particulate form deposited in deposition step c) to create the surface protective coating 3 is constituted by 80% to 90%, by weight, of tungsten carbide (WC) and the remaining by cobalt (Co). Even more preferably, the material in particulate form deposited in deposition step c) to create the surface protective coating 3 is constituted by 88%, by weight, of tungsten carbide (WC) and 12% of cobalt (Co), or by 83%, by weight, of tungsten carbide (WC) and 17% of cobalt (Co).

Advantageously, the brake disc is prepared with a portion suitable for fixing the disc to a vehicle, constituted by an annular portion 4 arranged centrally to the disc 1 and concentric with the braking band 2. The fixing portion 4 supports the connection element 5 to the wheel hub (i.e., the bell). The bell may be formed in one piece with the annular fixing portion (as illustrated in the accompanying figures) or be manufactured separately and, then, fixed by means of suitable connection elements to the fixing portion.

The annular fixing portion 4 can be made of the same material as the braking band, i.e., grey cast iron, or in another suitable material. Even the bell 5 may be made of grey cast iron or another suitable material. In particular, the entire disc (i.e., braking band, fixing portion and bell) can be made of grey cast iron.

Preferably, the braking band 2 is made by casting. Similarly, when made of grey cast iron, the fixing portion and/or the bell can be made by casting.

The annular fixing portion may be made in one piece with the braking band (as illustrated in the accompanying figures) or be made as a separate body, mechanically connected to the braking band.

Preferably, the deposition step b) of the layer of chromium carbide and nickel-chromium is preceded by a step d) of preparation of the surface on which the base protective coating 30 must be realised. In particular, the surface preparation step d) consists of cleaning the surface with solvent suitable to remove oil or dirt. Preferably, the preparation step d) can comprise abrasive actions on the disc surface, for example by sanding or polishing.

Advantageously, the material in particulate form (chromium carbide and nickel-chromium) that is deposited in step b) to form the base protective coating 30 has a particle size between 5 and 40 µm. The choice of this range of values allows giving the coating characteristics of high density and adhesion capacity to the deposition surface.

Preferably, the base protective coating 30 has a thickness of between 20 µm and 60 µm, and preferably equal to 40 µm. The choice of this range of values allows to obtain an excellent compromise between effectiveness of the antioxidant protective action and the limitation of thermal expansion of the coating itself. In other words: if the thickness of the base protective coating 30 were less than 20 µm, the protective antioxidant action would not be sufficient. On the other hand, a thickness greater than 60 µm, could lead, over time, to an imperfect adhesion due to thermal expansions that occur during the life cycle of a brake disc.

Within the aforesaid thickness range, the base protective coating 30 allows performing the already mentioned "damping" effect that helps preserve the integrity of the surface protective coating 3.

Advantageously, the material in particulate form (tungsten carbide and cobalt) that is deposited in step c) to form the surface protective coating has a particle size between 5 and 40 µm. The choice of this range of values allows giving the coating characteristics of high density, hardness and limited porosity.

Preferably, the surface protective coating 3 has a thickness of between 30 µm and 70 µm, and preferably equal to 50 µm. The choice of this range of values allows to obtain an excellent compromise between consumption of the layer of protective coating and limitation of thermal expansion of the coating itself. In other words, if the thickness of the protective coating were less than 20 µm, in the event of wear, it would be completely removed in an excessively short time. On the other hand, a thickness greater than 80 µm, could lead, over time, to an imperfect adhesion due to thermal expansions that occur during the life cycle of brake disc.

As already mentioned, both the chromium carbide and the nickel-chromium that form the base protective coating 30, and the tungsten carbide and the cobalt that form the surface protective coating 3 are deposited in particulate form respectively on the disc and on the base protective coating 30 with HVOF technique, HVAF technique or KM technique.

These are three deposition techniques that are known to a technician of the sector, and will therefore not be described in detail.

HVOF (High Velocity Oxygen Fuel) is a powder spray deposition technique that uses a spray device with a mixing and combustion chamber and a spray nozzle. Oxygen and fuel are fed into the chamber. The hot combustion gas that is formed at pressures close to 1 MPA passes through the convergent-divergent nozzle and the powder material reaches hypersonic speed (i.e., higher than MACH 5). The powder material to be deposited is injected into the hot gas flow, where it quickly melts and is accelerated to speeds on the order of 1000 m/s. After impacting the deposition surface, the melted material cools rapidly and, due to the impact with high kinetic energy, forms a very dense and compact structure.

The HVAF (High Velocity Air Fuel) deposition technique is similar to the HVOF technique. The difference lies in the fact that, in the HVAF technique, the combustion chamber is fed with air instead of oxygen. The temperatures involved are therefore lower than those of HVOF. This allows more control over the thermal alteration of the coating.

The KM (Kinetic Metallisation) deposition technique is a solid-state deposition process in which metal powders are sprayed through a two-phase sonic deposition nozzle that accelerates and triboelectrically charges the metal particles in a flow of inert gas. It is envisaged that the transport flow is supplied with thermal energy. In the process, the potential energy of the flow of compressed inert gas and the thermal energy supplied are transformed into kinetic energy of the powder. After being accelerated to high speed and electrically charged, the particles are directed against the deposition surface. The high-speed collision of the metal particles with this surface causes an ample deformation of the particle (approximately 80% in the normal direction on impact). This deformation results in, a huge increase in the surface area of the particles. On impact, there is therefore intimate contact between the particles and the deposition surface, which leads to the formation of metallic bonds and to a coating having a very dense and compact structure.

Advantageously, as an alternative to the three deposition techniques listed above, having in common the fact that they are impact deposition techniques with high kinetic energy, other techniques can be used that exploit different deposition methods, but which are able to generate coatings having a very dense and compact structure.

The combination of the HVOF, HVAF or KM deposition technique and the chemical components used for the formation of the two protective coatings, base 30 and surface 3, allows obtaining protective coatings with high bond strength on the underlying material on which they are deposited.

In particular, the aforesaid combination allows obtaining a high degree of anchoring of chromium carbide and nickel-chromium (base coating 30) on grey cast iron or steel, and tungsten carbide and cobalt (surface coating 3) on the layer of chromium carbide and nickel-chromium.

The absence of free carbon (C), preferably not even present in trace form, in the materials used to form the two coatings helps reduce the risk of detachments. In fact, it has been found that, in the case of application of the coating with flame spray techniques, one cause of the detachment of traditional protective coatings from aluminium, aluminium alloy, grey cast iron or steel discs is the presence of free carbon in the protective coating. In fact, the carbon tends to burn, combining with the oxygen incorporated in the protective coating during its formation. This leads to the formation of micro-bubbles in the coating, which can prevent an adequate adhesion of the coating to the disc, favouring detachment thereof.

According to a particularly preferred implementation of the invention, both the material in particulate form deposited in deposition step b) to create the base protective coating 30 and the material in particulate form deposited in deposition step c) to create the surface protective coating 3 are deposited with HVOF (High Velocity Oxygen Fuel) technique. In fact, it has been verified that this technique—in particular if associated with a braking band or to an entire disc made of grey cast iron—allows to obtain a combined protective coating (base+surface) that offers the best compromise in terms of wear resistance and tribological performance.

In more detail, based on the experimental tests carried out, with respect to the (preferred) HVOF (High Velocity Oxygen Fuel) technique, the HVAF (High Velocity Air Fuel) technique allows obtaining compact, uniform and regular coatings with thicknesses close to the nominal values. Coatings created with HVOF are less compact, with a "spongy" appearance and variable thickness.

Thermal shock tests performed on samples with coatings created with HVOF and HVAF show damage that affects only the surface protective coating WC+Co, detectable on all the samples and consisting of micro-cracking of the coating. However, this micro-cracking appears more pronounced in samples with coatings produced with HVAF technique, probably due to the increased stiffness of the coating. This makes the HVOF technique even more preferable.

In all cases, the base protective coating of $Cr_3C_2$+Ni suffered no consequences following the thermal shock test, being always dense and adhering perfectly to the cast iron without cracks.

As mentioned earlier, the base protective coating 30 and the surface protective coating 3 cover at least one of the two braking surfaces of the braking band.

Hereinafter, the combination of the base protective coating 30 and the surface protective coating 3 will be referred to globally as "combined protective coating" 3,30.

Figure 2:
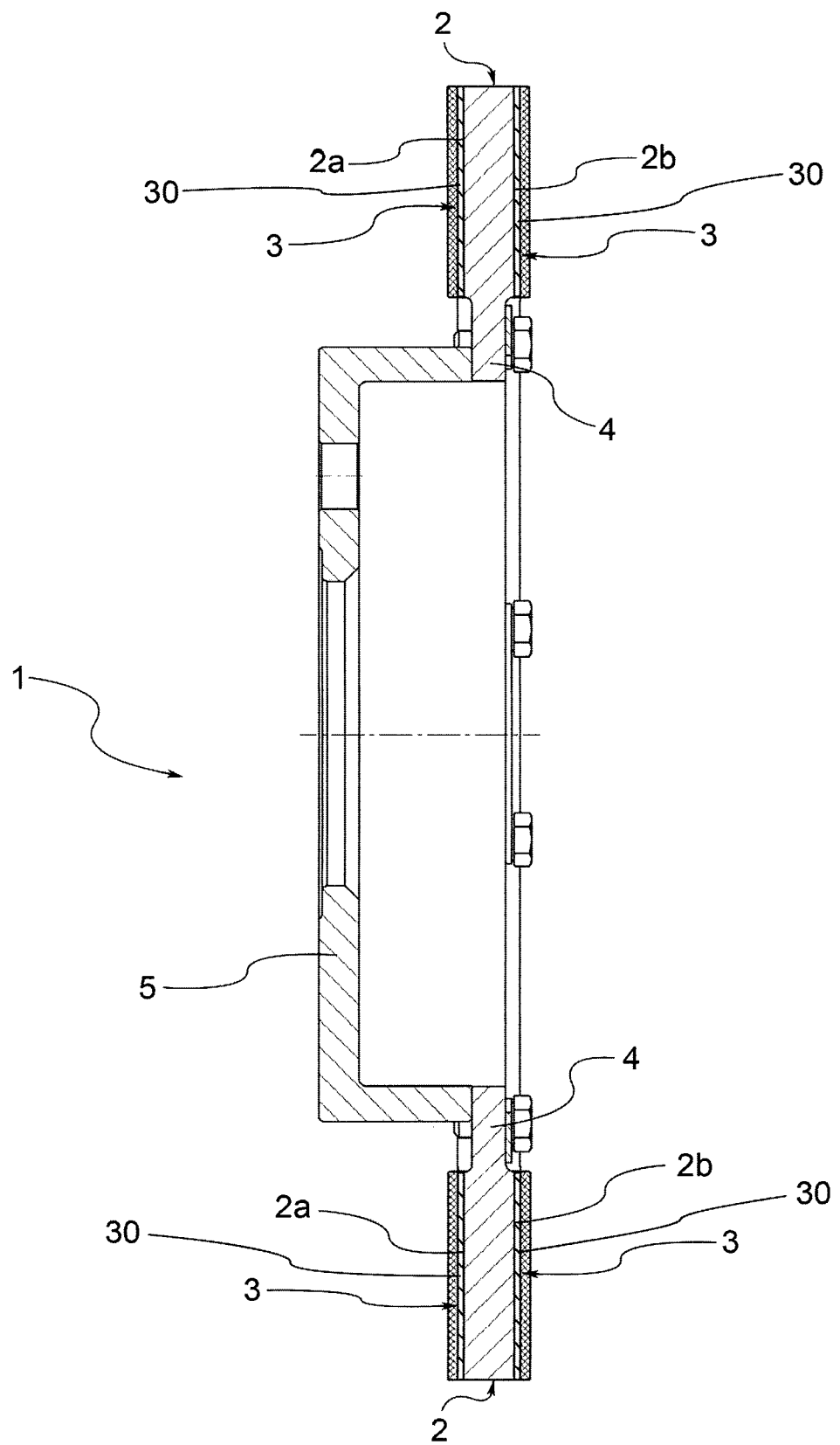
FIG. 2 is a sectional view of the disc of FIG. 1, according to the section line II-II indicated in it.

Preferably, as shown in FIG. 2, the disc 1 is provided with a "combined protective coating" 3,30 that covers both braking surfaces 2a and 2b of the braking band 2.

In particular, the combined protective coating 3,30 can cover only the braking band, on a single braking surface or on both.

According to embodiments not illustrated in the accompanying figures, the combined protective coating 3,30 can also be extended to other parts of the disc 1, such as the annular fixing portion 4 and the bell 5, up to covering the entire surface of the disc 1. In particular, the combined protective coating 3,30 can cover—in addition to the braking band—only the fixing portion or only the bell. The choice is essentially dictated by aesthetic reasons, to have a homogeneous colour and/or finish on the entire disc or between some portions of it.

Advantageously, the deposition of the particulate material for the formation of the combined protective coating 3,30 can be carried out in a differentiated manner on the surface of the disc at least in terms of the coating thickness.

In correspondence of the braking band, the combined protective coating 3,30 can be created with the same thickness on the two opposite braking surfaces. Alternative solutions can be envisaged wherein the combined protective coating 3,30 is realised by differentiating the different thicknesses between the two braking surfaces of the braking band.

According to a particularly preferred form of implementation of the method, the deposition step b) of the layer of chromium carbide and nickel-chromium for the formation of the base protective coating 30 comprises two or more distinct deposition passages of chromium carbide particulate on the same surface to form the protective coating.

In more detail, the aforesaid deposition step b) comprises:

a first deposition passage of chromium carbide and nickel-chromium in particulate form to create a first layer of base protective coating 30 directly on the disc; and a second deposition passage of chromium carbide and nickel-chromium in particulate form to create a second layer on the first layer.

As will be clarified below, the second finishing layer allows adjusting the surface finish of the base protective coating 3.

In particular, the division into two or more passages of deposition step b) of chromium carbide and nickel-chromium allows differentiating at least the particle size of the chromium carbide and nickel-chromium used in the different passes. This makes the deposition step b) more flexible.

Advantageously, the chromium carbide and nickel-chromium particles deposited with the first deposition passage have a larger particle size than that deposited with the second deposition pass. In particular, the chromium carbide and nickel-chromium particles deposited with the first deposition passage have a particle size between 30 and 40 µm, while the chromium carbide and nickel-chromium deposited with the second deposition passage have a particle size of between 5 and 20 µm.

The formation of the base protective coating 30 with two separate deposition passes, using a coarser particle size for the formation of the first layer and a finer particle size for the formation of the second layer (with finishing function), allows obtaining a coating that, already at the end of deposition, has the desired surface finishing characteristics, as a function of the subsequent deposition of the surface protective coating. Such desired surface finishing characteristics can be obtained without the need to rectify and/or perform other surface finishing operations for the coating. The particles deposited with the second passage fill in the coarse surface roughness of the base layer. Advantageously, the level of surface finish of the coating can be adjusted by adjusting the size of the particles deposited with the second pass.

Preferably, the first layer of the base protective coating 30 has a thickness of between ⅔ and ¾ of the total thickness of the coating, while the second layer of the base protective coating 30 has a thickness comprised between ¼ and ⅔ of the total thickness of the coating.

According to a particularly preferred form of implementation of the method, deposition step c) of the particulate material (WC+Co) that forms the surface protective coating 3 comprises two or more distinct deposition passages of the particulate material on the same surface to form the protective coating.

In more detail, the aforesaid deposition step c) comprises:

a first deposition passage of the material in particulate form to create a first coating layer directly on the base protective coating 30; and a second deposition passage of the material in particulate form to create a second layer on the first layer of surface protective coating 3.

Similar to deposition step b) of the base coating, also the division of deposition step c) into two or more deposition passages of the particulate material that forms the surface protective coating 3 allows, in particular, differentiating at least the particle size of the particulate material used in the different passes. This makes deposition step c) more flexible.

Advantageously, the particulate material deposited with the first deposition passage has a larger particle size than that deposited with the second deposition pass. In particular, the particulate material deposited with the first deposition passage has a particle size between 30 and 40 µm, while the particulate material deposited with the second deposition passage has a particle size of between 5 and 20 µm.

The formation of the surface protective coating 3 with two separate deposition passes, using a coarser particle size for the formation of the first layer and a finer particle size for the formation of the finishing layer, allows obtaining a surface protective coating 3 that, already at the end of deposition, has the desired surface finishing characteristics, without the need to rectify and/or carry out other surface finishing for the coating. The particles deposited with the second passage fill in the coarse surface roughness of the base layer. Advantageously, the finishing level of the surface protective coating 3 can be adjusted by adjusting the size of the particles deposited with the second pass.

In particular, using for the first passage particles with a particle size of 30 and 40 µm and for the second passage particles with a particle size of 5 and 20 µm, the surface protective coating 3 has, in correspondence of the finishing layer, a roughness Ra between 2.0 and 3.0 µm.

Preferably, the first layer of the surface protective coating 3 has a thickness of between ¾ and ¾ of the total thickness of the coating, while the second layer of the surface protective coating 3 has a thickness comprised between ¼ and ¾ of the total thickness of the coating.

Overall, the combination of the HVOF, HVAF or KM deposition technique of the particulate material, the chemical components used and of the multiple-passage deposition method allows obtaining a coating with a limited level of surface roughness, particularly suitable for the purposes of use of the brake disc 1.

Comparative experimental tests have been conducted of a disc made according to the invention and discs made according to known techniques. In particular, the following discs were compared:

A) grey cast iron brake disc with a "combined" protective coating according to the invention, made with HVOF technique, with base protective coating ($Cr_3C_2$+NiCr) 40 μm thick and surface protective coating (WC+Co) 50 μm thick;

B) a traditional grey cast iron without protective coating;

C) a grey cast iron disc with a protective coating of WC+Co+Cr 50 μm thick, made according to the teaching provided by international application WO2014/097187.

Thermal shock and dynamic bench tests were conducted thermal (running-in, AK Master and wear).

The tests showed that, under the same test conditions, disc A according to the invention had a duration in terms of wear appreciably higher than the traditional disc B and comparable to that of disc C.

From a point of view of tribological behaviour (friction, fading, running-in), under the same test conditions, disc A according to the invention had performance substantially comparable to traditional disc B and disc C with single protective coating WC+Co+Cr.

It emerged, instead, that disc A according to the invention had superior behaviour compared to disc C with single protective coating WC+Co+Cr as regards resistance to thermal shock. Although, at the end of the tests, the surface protective coating 30 in WC+Co in disc A was highly worn due to the severity of the tests conducted, there were, however, no detachments of the surface protective coating 30 induced by the cracks that were generated. While, on disc C, detachments were noted, caused precisely by such cracks.

It should also be highlighted that, on disc A, there were not even local detachments of the base protective coating of chromium carbide and nickel-chromium. At the end of the tests, the base protective coating 30 was found to be always well adherent, despite that numerous fractures were noted in section that extended for hundreds or thousands of microns inside the material and that indicate a substantial yielding of the cast iron following the very severe thermomechanical stresses to which it was subjected.

Saline fog tests were also conducted to test corrosion resistance. These tests demonstrated that disc A according to the invention had superior behaviour compared to disc C with single protective coating WC+Co+Cr.

SEM analysis after exposure in saline fog showed that the base protective coating 30 of chromium carbide and nickel-chromium had relatively sparse cracking, with small fractures limited to the braking zone, outside of which the base protective coating was well compact and homogeneous. Even in section, it appeared well bonded to the substrate, not oxidized and free of oxidation residues at the cast iron/coating interface. In any case, there were bulges that were attributed to corrosion conveyed by the friction material (pads) and not by the presence of cracking. It should be noted that, in any case, the bulges were small and did not lead to detachment of the coating.

As can be appreciated from the description, the brake disc according to the invention allows overcoming the drawbacks presented in the prior art.

Thanks to the presence of the base protective coating of chromium carbide and nickel-chromium, the brake disc 1 according to the invention is substantially not subject to flaking of the surface protective coating suitable to provide wear resistance.

The layer of chromium carbide and nickel-chromium inhibits oxidation of the disc (made of aluminium, aluminium alloy, grey cast iron or steel).

In particular, the base protective coating of chromium carbide and nickel-chromium defines a sort of damper or elastic cushion between the disc and anti-wear surface protective coating, reducing the risk of cracking of the latter as a result of the stresses related to the operational life of the disc.

The disc 1 according to the invention is provided with a surface protective coating (covering at least the braking band) having:

a high bond strength, which provides a high degree of anchoring on the base protective coating of chromium carbide and nickel-chromium;

high wear resistance;

limited level of surface roughness;

high density;

high hardness; and limited porosity.

The brake disc 1 is also inexpensive to produce on the whole.

A person skilled in the art, in order to satisfy contingent and specific needs, may make several modifications and variations to the disc and disc brake described above, all however contained within the scope of the invention as defined by the following claims.

The invention claimed is:

1. A method for manufacturing a brake disc comprising the following operating steps:

a) preparing a brake disc, comprising a braking band and provided with two mutually opposite braking surfaces, each of which defines at least partially one of the two main faces of the disc, the braking band being made of aluminium or aluminium alloy, or being made of grey cast iron or steel;

b) depositing on the disc a layer consisting of chromium carbide (Cr3C2) and nickel-chromium (NiCr) in particulate form with HVOF (High Velocity Oxygen Fuel) technique, HVAF (High Velocity Air Fuel) technique or KM (Kinetic Metallisation) technique forming a base protective coating that consists of chromium carbide (Cr3C2) and nickle-chromium (NiCr) that covers at least one of the two braking surfaces of the braking band in direct contact with them; and c) depositing over said base protective coating a material in particulate form consisting of tungsten carbide (WC) and cobalt (Co) with HVOF (High Velocity Oxygen Fuel) technique, HVAF (High Velocity Air Fuel) technique or KM (Kinetic Metallisation) technique forming a surface protective coating that consist of tungsten carbide (WC) and cobalt (Co) that covers at least one of the two braking surfaces of the braking band.

2. The method according to claim 1, wherein the material in particulate form deposited in deposition step b) to create the base protective coating is constituted by 65% to 95% of chromium carbide (Cr3C2) and the remaining by nickel-chromium (NiCr).

3. The method according to claim 1, wherein the material in particulate form deposited in deposition step c) to create the surface protective coating is constituted by 80% to 90% by weight of tungsten carbide (WC) and the remaining by cobalt (Co).

4. The method according to claim 1, wherein both the material in particulate form deposited in deposition step b) to create the base protective coating and the material in particulate form deposited in deposition step c) to create the surface protective coating are deposited with HVOF (High Velocity Oxygen Fuel) technique.

5. The method according to claim 1, wherein the base protective coating has a thickness between 20 µm and 60 µm.

6. The method according to claim 1, wherein the surface protective coating has a thickness between 30 µm and 70 µm.

7. The method according to claim 1, wherein the material in particulate form that is deposited in step b) to form the base protective coating has a particle size between 5 and 40 µm.

8. The method according to claim 1, wherein the material in particulate form that is deposited in step c) to form the surface protective coating has a particle size between 5 and 40 µm.

9. The method according to claim 1, wherein the deposition step b) comprises two or more distinct deposition passages of chromium carbide (Cr3C2) and nickel-chromium (NiCr) on the same surface to form the base protective coating.

10. The method according to claim 9, wherein the deposition step b) comprises a first deposition passage of chromium carbide (Cr3C2) and nickel-chromium (NiCr) in particulate form to create a first base protective layer directly on the disc and a second deposition passage of chromium carbide (Cr3C2) and nickel-chromium (NiCr) in particulate form to create a second layer over the first layer, the chromium carbide (Cr3C2) and nickel-chromium (NiCr) deposited with the first deposition passage having a particle size greater than that deposited with the second deposition pass.

11. The method according to claim 10, wherein the chromium carbide (Cr3C2) and nickel-chromium (NiCr) deposited with the first deposition passage have a particle size between 30 and 40 µm, while the chromium carbide (Cr3C2) and nickel-chromium (NiCr) deposited with the second deposition passage have a particle size of between 5 and 20 µm.

12. The method according to claim 1, wherein the braking band is made of grey cast iron.

13. A brake disc for a disc brake, comprising a braking band, provided with two mutually opposite braking surfaces, each of which defines at least partially one of the two main faces of the disc, the braking band being made of aluminium or aluminium alloy, or being made of grey cast iron or steel; said disc being provided with:
 a base protective coating that covers at least one of the two braking surfaces of the braking band, said base protective coating consisting of chromium carbide (Cr3C2) and nickel-chromium (NiCr) and being obtained by depositing, directly on the disc, chromium carbide (Cr3C2) and nickel-chromium (NiCr) in particulate form with HVOF (High Velocity Oxygen Fuel) technique, HVAF (High Velocity Air Fuel) technique or KM (Kinetic Metallisation) technique; and
 a surface protective coating that covers at least one of the two braking surfaces of the braking band, said surface protective coating consisting of tungsten carbide (WC) and cobalt (Co) and being obtained by depositing, on the base protective coating, tungsten carbide (WC) and cobalt (Co) in particulate form with HVOF (High Velocity Oxygen Fuel) technique, HVAF (High Velocity Air Fuel) technique or KM (Kinetic Metallisation) technique.

14. The disc according to claim 13, wherein the base protective coating is constituted by 65% to 95% of chromium carbide (Cr3C2) and the remaining by nickel-chromium (NiCr).

15. The disc according to claim 13, wherein the surface protective coating is constituted by 80% to 90% by weight of tungsten carbide (WC) and the remaining by cobalt (Co).

16. The disc according to claim 13, wherein the base protective coating (30) has a thickness between 20 µm and 60 µm.

17. The disc according to claim 13, wherein surface protective coating has a thickness between 30 µm 70 µm.

18. The disc according to claim 13, wherein the braking band is made of grey cast iron.

* * * * *